United States Patent
Oda et al.

(10) Patent No.: US 12,388,527 B2
(45) Date of Patent: Aug. 12, 2025

(54) BRILLOUIN GAIN SPECTRUM DISTRIBUTION MEASUREMENT METHOD AND EQUIPMENT

(71) Applicant: NIPPON TELEGRAPH AND TELEPHONE CORPORATION, Tokyo (JP)

(72) Inventors: Tomokazu Oda, Musashino (JP); Daisuke Iida, Musashino (JP); Atsushi Nakamura, Musashino (JP); Yusuke Koshikiya, Musashino (JP); Nazuki Honda, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 95 days.

(21) Appl. No.: 18/272,188

(22) PCT Filed: Jan. 26, 2021

(86) PCT No.: PCT/JP2021/002547
§ 371 (c)(1),
(2) Date: Jul. 13, 2023

(87) PCT Pub. No.: WO2022/162718
PCT Pub. Date: Aug. 4, 2022

(65) Prior Publication Data
US 2024/0146413 A1    May 2, 2024

(51) Int. Cl.
*H04B 10/2537* (2013.01)
*G01D 5/353* (2006.01)

(52) U.S. Cl.
CPC ..... *H04B 10/2537* (2013.01); *G01D 5/35364* (2013.01)

(58) Field of Classification Search
CPC .......... H04B 10/2537; G01D 5/35364; G01M 11/00; A23L 33/10; A23V 2002/00;
(Continued)

(56) References Cited

FOREIGN PATENT DOCUMENTS

JP    2007-33183 A    2/2007

OTHER PUBLICATIONS

Haritz Iribas et al, Enhanced tolerance to pulse extinction ratio in Brillouin optical time domain analysis sensors by dithering of the optical source, 2015 (Year: 2015).*

(Continued)

*Primary Examiner* — Tri T Ton
(74) *Attorney, Agent, or Firm* — Harness, Dickey & Pierce, P.L.C.

(57) ABSTRACT

An object of the present invention is to provide a Brillouin gain spectrum distribution measuring method and apparatus capable of measuring a BGS, having a line width narrower than usual, in a distributed manner in the longitudinal direction of an optical fiber under test.
This measuring apparatus prepares pump light in which a pulse is added to continuous light and probe light of continuous light in which a frequency is shifted from the pump light, makes the probe light incident on one end of the FUT and the pump light incident on the other end, and obtains a time waveform of a component amplified by the pump light pulse of a probe light intensity amplified by the pump light. This measuring apparatus changes an optical frequency difference between the pump light and the probe light, and obtains a time waveform for each optical frequency difference. This measuring apparatus obtains a BGS distribution of the FUT from these time waveforms.

4 Claims, 5 Drawing Sheets

(58) Field of Classification Search
CPC .......... A23V 2200/332; A23V 2250/30; A61K 31/685; A61P 1/16; A61P 3/04; A61P 3/06; A61P 3/10; A61P 9/10; A61P 9/12; C01B 25/375; C01B 25/45; C01P 2004/80; H01M 2004/028; H01M 4/366; H01M 4/5825; Y02E 60/10
See application file for complete search history.

(56) References Cited

OTHER PUBLICATIONS

Toshio Kurashima et al., "Distributed-temperature sensing using stimulated Brillouin scattering in optical silica fibers", Opt. Lett., vol. 15, No. 18, pp. 1038-1040, 1990.

Daisuke Iida et al., "Low bandwidth temperature sensing using reference stimulated Brillouin scattered beam", IEICE Technical Report, vol. 108, No. 245, OFT 2008-43, pp. 45-50, Oct. 2008 with machine generated English translation thereof.

Aydin Yeniay et al., "Spontaneous and Stimulated Brillouin Scattering Gain Spectra in Optical Fibers", J. Light. Technol., vol. 20, No. 8, pp. 1425-1432, 2002.

Haritz Iribas et al., "Enhanced tolerance to pulse extinction ratio in Brillouin optical time domain analysis sensors by dithering of the optical source", Proceeding of SPIE, 2015, vol. 9634, pp. 96344Z-1-96344Z-4, doi: 10.1117/12.2195264.

* cited by examiner

BRILLOUIN GAIN SPECTRUM DISTRIBUTION MEASUREMENT METHOD AND EQUIPMENT

CROSS-REFERENCE TO RELATED APPLICATIONS

This application is a 371 U.S. National Phase of International Application No. PCT/JP2021/002547, filed on Jan. 26, 2021. The entire disclosure of the above application is incorporated herein by reference.

TECHNICAL FIELD

The present disclosure relates to a measuring method and a measuring apparatus thereof capable of obtaining a Brillouin gain spectrum distribution in a longitudinal direction of an optical fiber with a narrow line width.

BACKGROUND ART

Temperature sensing and strain sensing by Brillouin time domain analysis (BOTDA) have been proposed (see, for example, NPL 1). The measuring method of NPL 1 utilizes a characteristic that the amount of Brillouin frequency shift (BFS) in an optical fiber changes with temperature and strain. Since the BFS can be obtained in a distributed manner in the longitudinal direction of the fiber, distribution sensing of temperature and strain is enabled.

In the BOTDA, pump light is made incident on one end of an optical fiber under test and probe light whose frequency difference is set to the pump light is made incident on the other end, and the amount of amplification (Brillouin gain) of the probe light amplified by Brillouin interaction with the pump light is observed. Here, the amount of amplification with respect to the frequency difference is a Brillouin gain spectrum (BGS), and the BFS, which is the frequency at which the amount of amplification is maximized, is obtained from this BGS.

It is known that the accuracy of BFS that can be obtained from the BGS depends generally on the line width of the BGS. The BGS of a single mode fiber at a wavelength of 1,550 nm generally has a full width at half maximum (FWHM) of 30 to 40 MHz, and in this case, a measurement accuracy of the BFS of about 1 MHz is obtained. As described above, since the BFS corresponds to temperature and strain, the acquisition of a narrow line width of the BGS is important for improving the accuracy of temperature and strain measurement.

It is known that the line width of the BGS depends on the Brillouin action length, and it has been reported that that of a pure silica core fiber of 40 km can be narrowed down to 3.5 MHz (see, for example, NPL 2).

CITATION LIST

Non Patent Literature

[NPL 1] T. Kurashima et al., Opt. Lett., 15(18), 1038-10400 (1990).
[NPL 2] Iida et al., IEICE Technical Report, vol. 108, No. 245, OFT 2008-43, pp. 45-50, October 2008.
[NPL 3] A. Yeniay et al., J. Light. Technol., 20(8), 1425-1432 (2002).

SUMMARY OF INVENTION

Technical Problem

However, if continuous light is incident and a Brillouin action is generated in the entire section of an optical fiber under test as in the case of NPL 2, there is a problem that the BGS cannot be measured in a distributed manner in the longitudinal direction. In order to solve the above problem, an object of the present invention is to provide a Brillouin gain spectrum distribution measuring method and apparatus capable of measuring a BGS, having a line width narrower than usual, in a distributed manner in the longitudinal direction of an optical fiber under test.

Solution to Problem

In order to achieve the above object, a Brillouin gain spectrum distribution measuring method and apparatus according to the present invention perform Brillouin time domain analysis (BOTDA) using pump light in which a pulse component is superimposed on a part of continuous light.

Specifically, a Brillouin gain spectrum distribution measuring method according to the present invention includes making probe light of continuous light and pump light of continuous light incident from one end and the other end of an optical fiber under test, respectively, to generate a Brillouin action in an entire section of the optical fiber under test, making pulse-like pulsed pump light having the same optical frequency as that of the pump light incident from the other end of the optical fiber under test in a state where the Brillouin action in the entire section is maintained, extracting an amplification component by the pulsed pump light from the amplified probe light output from the other end of the optical fiber under test, measuring a time waveform of the amplification component for each optical frequency difference between the probe light and the pump light, and obtaining a Brillouin gain spectrum from the time waveform of the amplification component measured for each optical frequency difference in a distributed manner in a longitudinal direction of the optical fiber under test.

In addition, a Brillouin gain spectrum distribution measuring apparatus according to the present invention includes a light incident device that makes probe light of continuous light and pump light of continuous light incident from one end and the other end of an optical fiber under test, respectively, to generate a Brillouin action in an entire section of the optical fiber under test, and makes pulse-like pulsed pump light having the same optical frequency as that of the pump light incident from the other end of the optical fiber under test in a state where the Brillouin action in the entire section is maintained, a light receiver that extracts an amplification component by the pulsed pump light from the amplified probe light output from the other end of the optical fiber under test, and an analysis device that measures a time waveform of the amplification component for each optical frequency difference between the probe light and the pump light, and obtains a Brillouin gain spectrum from the time waveform of the amplification component measured for each optical frequency difference in a distributed manner in a longitudinal direction of the optical fiber under test.

The BGS width can be narrowed by superimposing pulse-like pulsed pump light on continuous pump light. Therefore, the present invention can provide a Brillouin gain spectrum distribution measuring method and apparatus capable of measuring a BGS, having a line width narrower than usual, in a distributed manner in the longitudinal direction of an optical fiber under test.

In the Brillouin gain spectrum distribution measuring method and apparatus according to the present invention, a light intensity of the pump light is increased to obtain the pulsed pump light.

The above inventions can be combined wherever possible.

Advantageous Effects of Invention

The present invention can provide a Brillouin gain spectrum distribution measuring method and apparatus capable of measuring a BGS, having a line width narrower than usual, in a distributed manner in the longitudinal direction of an optical fiber under test.

BRIEF DESCRIPTION OF DRAWINGS

FIG. 5(*a*) shows the BGS measured by a normal BOTDR, and FIG. 5(*b*) shows the BGS measured by the measuring method according to the present invention.

DESCRIPTION OF EMBODIMENTS

Figure 1:
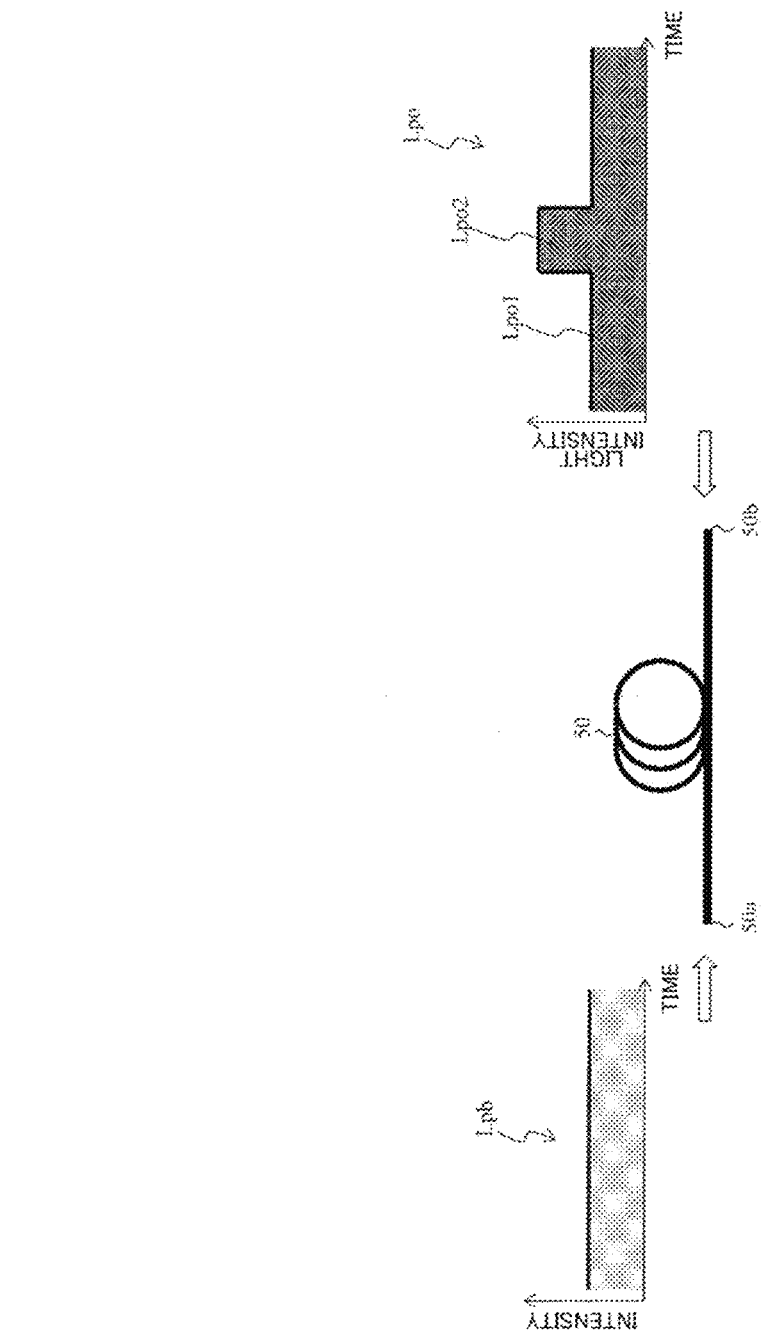
FIG. 1 is a diagram illustrating the measurement concept of a Brillouin gain spectrum distribution measuring method according to the present invention.

Embodiments of the present invention will be described with reference to the accompanying drawings. The embodiments described below are examples of the present invention, and the present invention is not limited to the following embodiments. Note that, in the present specification and the drawings, components having the same reference numerals indicate the same components.

SUMMARY OF INVENTION

The spectrum $S(\omega)$ obtained from the Brillouin gain can be represented by the following equation (see, for example, NPL 3).

[Math. 1]

$$S(\omega) = \frac{4h\omega_s(N+1)}{ncA\Gamma}\left[\exp\left(\frac{G\left(\frac{\Gamma}{2}\right)^2}{\omega^2 + \left(\frac{\Gamma}{2}\right)^2}\right) - 1\right] \quad (1)$$

Here, $\omega$ is an optical frequency difference between the probe light and the pump light, h is the Planck constant, $\omega_s$ is an optical frequency of the probe light, and N is an average number of phonons for each acoustic mode. In addition, n is a refractive index of the core, c is the velocity of light in a vacuum, A is an effective cross-sectional area, $\Gamma$ is a phonon attenuation factor, and G represents the Brillouin gain.

From Equation (1), the BGS shape is determined by the Brillouin gain G and the phonon attenuation factor $\Gamma$. When the pump light is a pulse, the gain G becomes small because the Brillouin action length is short. In this case, Equation (1) becomes a Lorentzian distribution, and the spectrum width $\Delta\omega$ of the BGS at this time is given by $\Delta\omega=\Gamma$.

On the other hand, when the pump light is continuous light, the gain G becomes large because the Brillouin action length is long. In this case, Equation (1) becomes a Gaussian distribution, and the spectrum width $\Delta\omega$ of the BGS at this time is given by the following equation.

[Math. 2]

$$\Delta\omega = \Gamma\left[\frac{\ln 2}{G}\right] \quad (2)$$

Equation (2) expresses that the spectrum width narrows as the gain G increases. From Equation (2), it can be seen that generating the Brillouin action in the entire fiber section is effective in obtaining a narrow line width BGS.

In the present invention, pump light in which a pulse is added to a part of continuous light in advance is used as a measurement configuration in order to measure a BGS distribution of a narrow line width in the normal BOTDA configuration.

FIG. 1 is a diagram illustrating the concept of BGS measurement according to the present invention. In the BGS measurement, pump light Lpo1 of continuous light is first made incident on an optical fiber under test (FUT) 50, and a Brillouin action is generated in the entire fiber section by the pump light Lpo1 and probe light Lpb. In a state where the action is maintained, pulsed pump light Lpo2 of a pulse component added to the pump light Lpo1 is made incident on the FUT 50, and a probe light intensity amplified by the pulse is measured.

Figure 2:
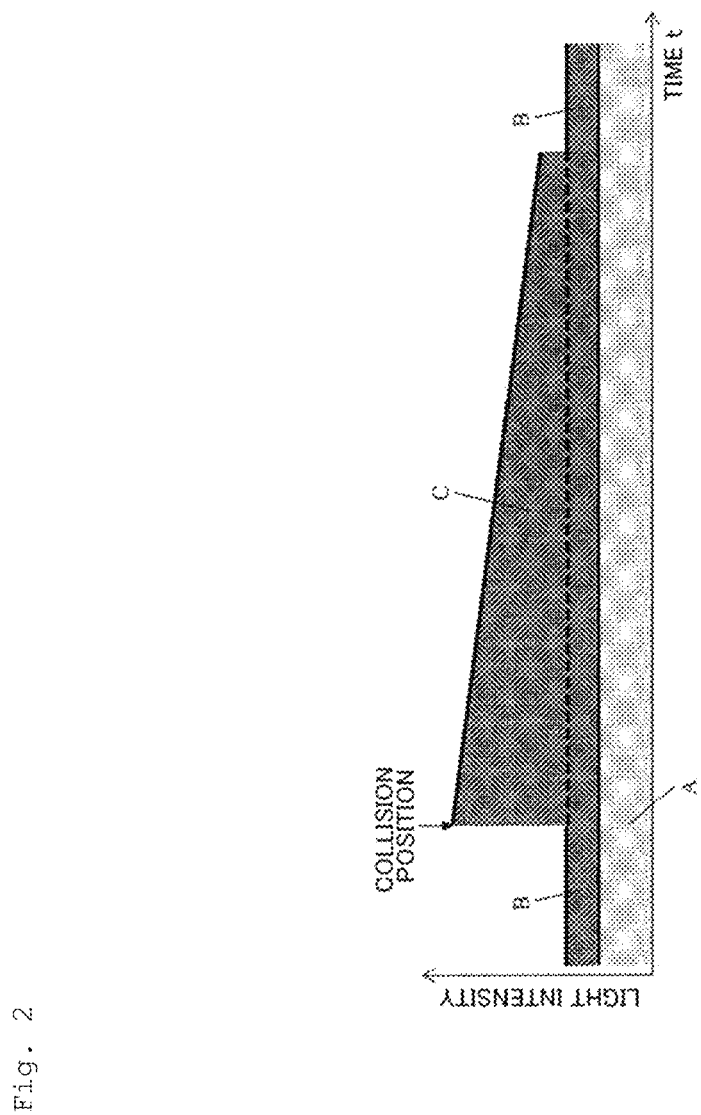
FIG. 2 is a diagram illustrating an example of amplified probe light in the Brillouin gain spectrum distribution measuring method according to the present invention.

FIG. 2 is a diagram illustrating the intensity waveform of the probe light observed after the emission of the FUT 50. Symbol A represents the light intensity of the probe light LPb after passing through the FUT 50, symbol B represents the amount of amplification by the continuous light component (pump light Lpo1) of the pump light Lpo, and symbol C represents the amount of amplification by the pulse component of the pump light (pulsed pump light Lpo2).

As illustrated in FIG. 2, the continuous light component of the pump light (pump light Lpo1) and the pulse component of the pump light (pulsed pump light Lpo2) amplify the probe light Lpb inside the FUT 50. The pump light Lpo1 always amplifies the probe light Lpb by a certain amount. On the other hand, the pulsed pump light Lpo2 differs in timing (time t) of amplifying the probe light Lpb depending on the collision position with the probe light Lpb in the FUT 50. In other words, in FIG. 2, the timing of amplifying the probe light Lpb by the pulsed pump light Lpo2 corresponds to the length direction of the FUT 50. Further, the amount of amplification of the probe light Lpb is gradually reduced because of attenuation due to loss on the FUT 50.

A time waveform of the probe light intensity is measured by utilizing the difference in the amplification timing, and the BGS at any position of the FUT 50 can be obtained by subtracting the probe light intensity after passing through the FUT 50 and the amplification by the pump light Lpo1 from the waveform.

Embodiment

Figure 3:
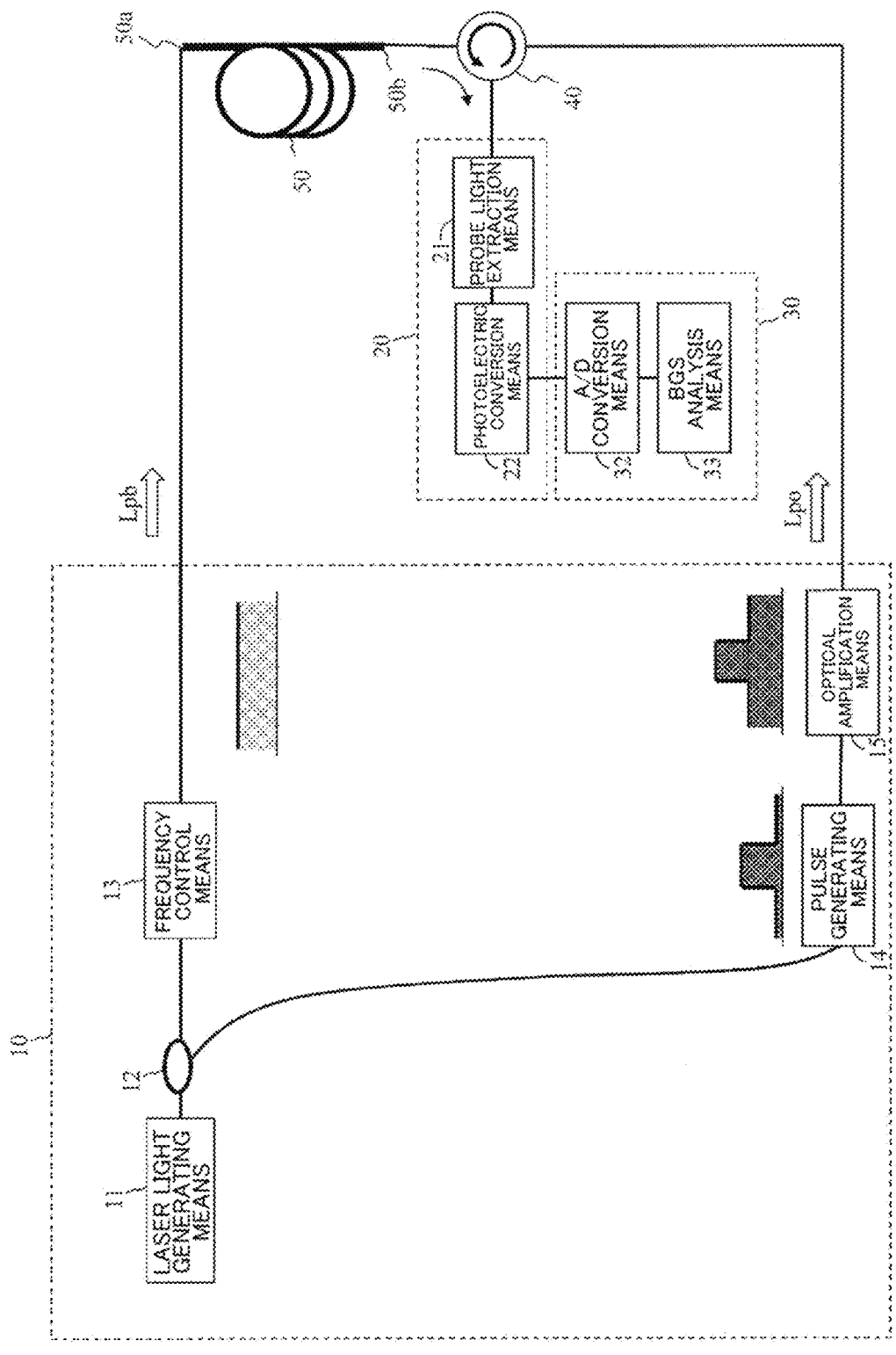
FIG. 3 is a diagram illustrating a Brillouin gain spectrum distribution measuring apparatus according to the present invention.

FIG. 3 is a diagram illustrating a measuring apparatus according to the present embodiment. The measuring apparatus includes:

a light incident device 10 that makes probe light Lpb of continuous light and pump light Lpo1 of continuous light incident from one end 50a and the other end 50b of an optical fiber under test 50, respectively, to generate a Brillouin action in an entire section of the optical fiber under test 50, and makes pulse-like pulsed pump light Lpo2 having the same optical frequency as that of the pump light Lpo1 incident from the other end 50b of the optical fiber under test 50 in a state where the Brillouin action in the entire section is maintained;

a light receiver 20 that extracts an amplification component by the pulsed pump light Lpo1 from the amplified probe light Lpb output from the other end 50b of the optical fiber under test 50; and an analysis device 30 that measures a time waveform of the amplification component for each optical frequency difference between the probe light Lpb and the pump light Lpo, and obtains a Brillouin gain spectrum from the time waveform of the amplification component measured for each optical frequency difference in a distributed manner in a longitudinal direction of the optical fiber under test 50.

The light incident device 10 includes a laser light generating means 11, a branching element 12, a frequency control means 13, a pulse generating means 14, and an optical amplification means 15. The light receiver 20 includes a probe light extraction means 21 and a photoelectric conversion means 22. The analysis device 30 includes an A/D conversion means 32 and a BGS analysis means 33.

The measuring apparatus makes the pump light Lpo, in which a pulse is added to continuous light, incident on the other end 50b of the FUT 50, and makes the probe light Lpb, in which an optical frequency is shifted from that of the pump light Lpo, incident on one end 50a, and measures BGS from a Brillouin gain generated by light collision.

In the light incident means 10, the light, output from the laser light generating means 11 that generates coherent light, is branched into two by the branching element 12; one is the probe light Lpb and the other is the pump light Lpo.

The optical frequency control means 13 imparts a frequency difference of about 10 to 11 GHz corresponding to Brillouin frequency shift (BFS) to one light from the laser light generating means 11, and makes the one light incident on one end 50a of the FUT 50 as the probe light Lpb. For example, the optical frequency control means 13 is an external modulator such as an SSB modulator constituted by LiNb3. In the present embodiment, although the type of branching the light, from one laser light generating means 11, into two is described, two lasers having different frequencies (wavelengths) may be used and the light sources of the pump light and the probe light may be separately assigned thereto to control the optical frequency difference between the two lasers.

On the other hand, the pulse generating means 14 pulses the other light from the laser light generating means 11. For example, an LN intensity modulator or the like can be used as the pulse generating means 14. In this case, a pulse having an extinction ratio of about 20 dB and slightly containing a continuous light component is generated. The pulse is amplified by the optical amplification means 15 to generate the pump light Lpo including the pump light Lpo1, of optical power capable of generating the Brillouin action and of continuous light, and the pulsed pump light Lpo2 added thereto. The pump light Lpo is made incident on the FUT 50 from the other end 50b. The pump light Lpo may have a shape in which a pulse is added to the continuous light, and may be generated by preparing the continuous light and the pulse separately and multiplexing them.

The pump light Lpo and the probe light Lpb collide with each other in the FUT 50, and the probe light Lpb is amplified by the Brillouin action. The amplified probe light Lpb is emitted from the other end 50b of the FUT 50, passes through an optical circulator 40, and is made incident on the probe light extraction means 21. The probe light extraction means 21 extracts only the probe light Lpb by removing the backscattered light component of the pump light Lpo. The probe light extraction means 21 may pass only the frequency of the probe light by using an optical filter, or may perform coherent detection of the same probe light before the FUT incidence as local light and extract only the probe light component by using a difference in beat frequency.

The photoelectric conversion means 22 converts the probe light Lpb from the probe light extraction means 21 into an electrical signal. The A/D conversion means 32 converts the electrical signal into digital data, and the BGS analysis means 33 analyzes the BGS distribution from the digital data.

The BGS analysis means 33 first subtracts a probe light intensity component A and a component B, which is amplified by the pump light of the continuous light, from the obtained probe light intensity waveform (see FIG. 2) to obtain only a component C, which is amplified by the pump light of the pulse. The BGS distribution is obtained by repeatedly measuring the amplification component C while changing the frequency difference between the pump light and the probe light.

Figure 4:
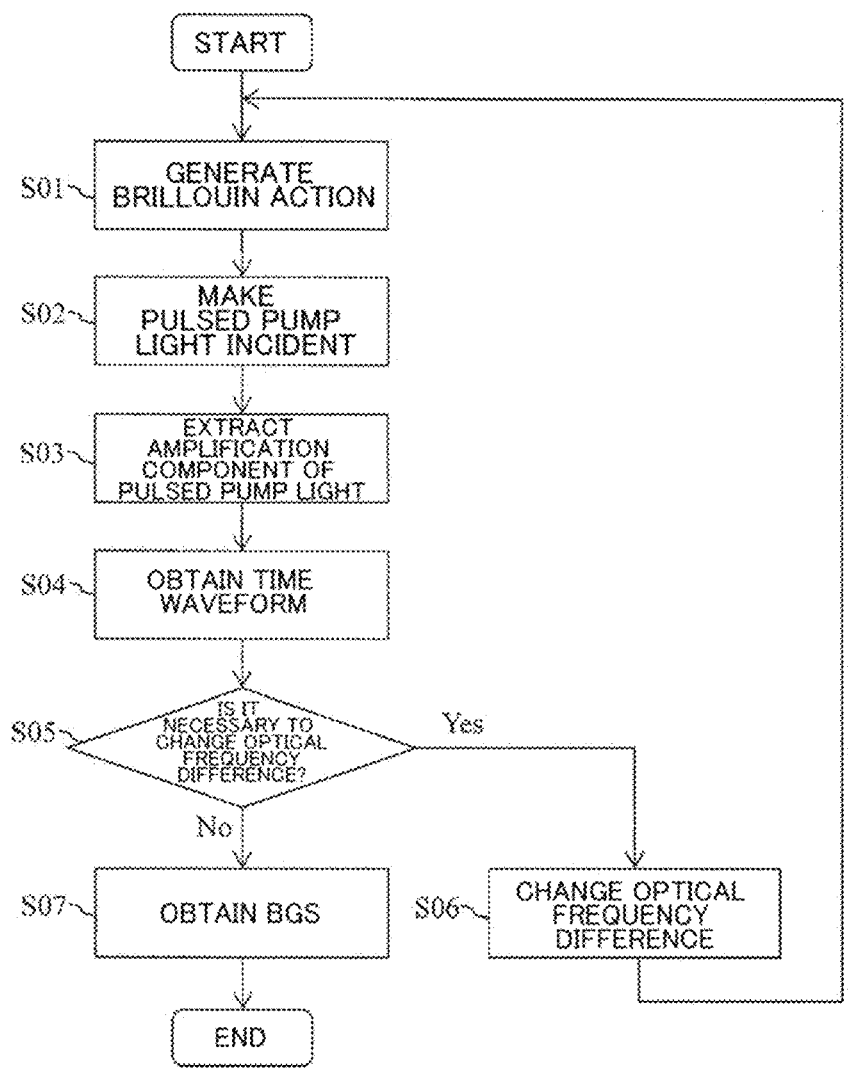
FIG. 4 is a diagram illustrating the Brillouin gain spectrum distribution measuring method according to the present invention.

FIG. 4 is a diagram illustrating a measuring method of the Brillouin gain spectrum distribution measuring apparatus shown in FIG. 3. This measuring method includes making probe light Lpb of continuous light and pump light Lpo1 of continuous light incident from one end 50a and the other end 50b of an FUT 50, respectively, to generate a Brillouin action in the entire section of the FUT 50 (step S01), making pulse-like pulsed pump light Lpo2 having the same optical frequency as that of the pump light Lpo1 incident from the other end 50b of the FUT 50 at a desired timing in a state where the Brillouin action in the entire section is maintained (step S02), extracting an amplification component (component C in FIG. 2) by the pulsed pump light Lpo2 from the amplified probe light Lpb output from the other end 50b of the FUT 50 (step S03), and measuring a time waveform of the amplification component for each optical frequency difference between the probe light Lpb and the pump light Lpo (steps S05 and S06), and obtaining a Brillouin gain spectrum from the time waveform of the amplification component measured for each optical frequency difference in a distributed manner in a longitudinal direction of the FUT 50 (step S07).

As described above, in step S02, the light intensity of the pump light Lpo1 may be increased to obtain the pulsed pump light Lpo2.

Effects

Figure 5:
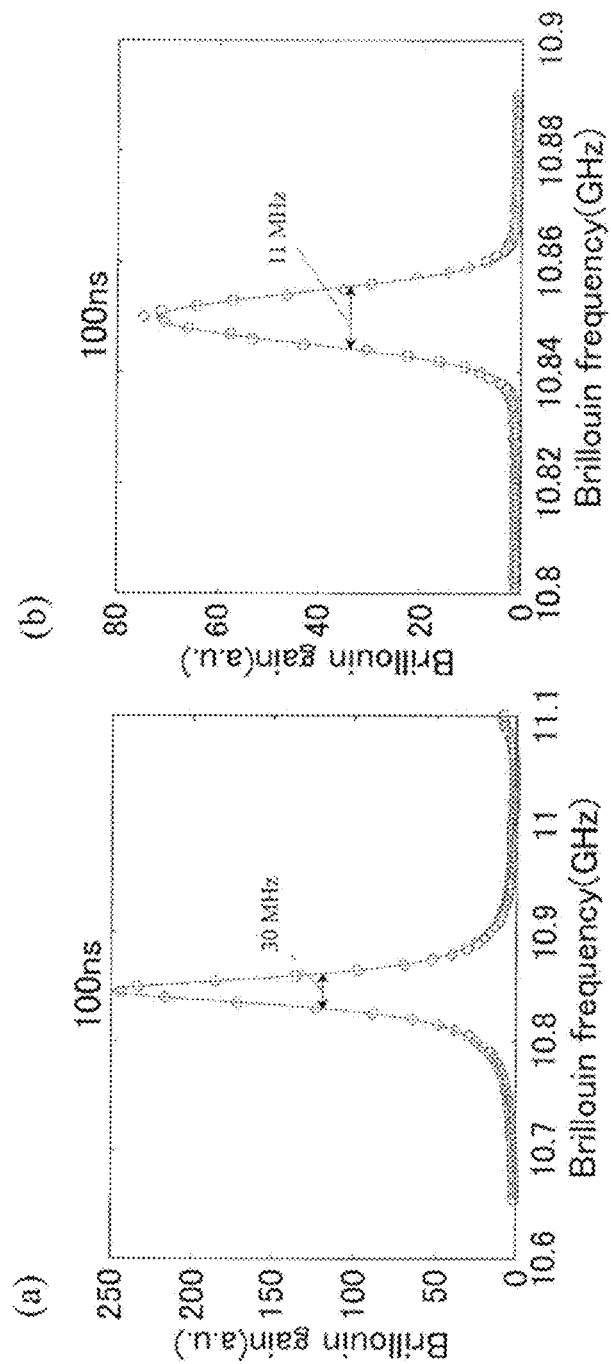
FIG. 5 is a diagram illustrating the effects of the Brillouin gain spectrum distribution measuring method and apparatus according to the present invention.

FIG. 5 is a diagram illustrating an example of the results of BGS measurement for the FUT 50 of 40 km. FIG. 5(*a*) shows the BGS measured with a pulse width of 100 ns in normal BOTDA (where pump light is a pulse), and FIG. 5(*b*) shows the BGS observed with the same pulse width of 100 ns in the measuring method of the present invention (pulse in which pump light is added to continuous light). From FIG. 5(*a*), it can be confirmed that the BGS shape has a Lorentzian distribution, and the FWHM of this BGS is about 30 MHz. On the other hand, FIG. 5(*b*), which is the result obtained by the present invention, has a Gaussian distribution, and the FWHM of this BGS is about 11 MHz. From these results, it can be seen that the line width can be made narrower than the BGS width obtained by the normal BOTDA in the measuring method of the present invention.

Other Embodiments

The BGS analysis means 33 described with reference to FIG. 3 can also be realized by a computer and a program, and the program can be recorded in a recording medium or provided through a network.

REFERENCE SIGNS LIST

10: Light incident device
11: Laser light generating means
12: Branching element
13: Frequency control means
14: Pulse generating means
15: Optical amplification means
20: Light receiver
21: Probe light extraction means
22: Photoelectric conversion means
30: Analysis device
32: A/D conversion means
33: BGS analysis means
40: Optical circulator
50: Optical fiber under test (FUT)
50*a*: One end
50*b*: Other end

The invention claimed is:

1. A Brillouin gain spectrum distribution measuring method comprising:
    making probe light of continuous light and pump light of continuous light incident from one end and the other end of an optical fiber under test, respectively, to generate a Brillouin action in an entire section of the optical fiber under test;
    making pulse-like pulsed pump light having the same optical frequency as that of the pump light incident from the other end of the optical fiber under test in a state where the Brillouin action in the entire section is maintained;
    measuring an intensity of the light output from the other end of the optical fiber under test;
    for each optical frequency difference between the probe light and the pump light, extracting an amplification component of the probe light amplified by the pulsed pump light by subtracting an intensity component of the probe light and a component of the probe light amplified by the pump light from the measured intensity of the light, thereby obtaining a Brillouin gain spectrum in a distributed manner in a longitudinal direction of the optical fiber under test.

2. The Brillouin gain spectrum distribution measuring method according to claim 1, wherein a light intensity of the pump light is increased to obtain the pulsed pump light.

3. A Brillouin gain spectrum distribution measuring apparatus comprising:
    a light incident device that makes probe light of continuous light and pump light of continuous light incident from one end and the other end of an optical fiber under test, respectively, to generate a Brillouin action in an entire section of the optical fiber under test, and makes pulse-like pulsed pump light having the same optical frequency as that of the pump light incident from the other end of the optical fiber under test in a state where the Brillouin action in the entire section is maintained;
    a light receiver that measures an intensity of the light output from the other end of the optical fiber under test; and
    an analysis device that, for each optical frequency difference between the probe light and the pump light, extracts an amplification component of the probe light amplified by the pulsed pump light by subtracting an intensity component of the probe light and a component of the probe light amplified by the pump light from the measured intensity of the light, thereby obtaining a Brillouin gain spectrum in a distributed manner in a longitudinal direction of the optical fiber under test.

4. The Brillouin gain spectrum distribution measuring apparatus according to claim 3, wherein the light incident device increases a light intensity of the pump light to obtain the pulsed pump light.

* * * * *